United States Patent [19]

Techer et al.

[11] Patent Number: 4,899,824
[45] Date of Patent: Feb. 13, 1990

[54] DAMPENING DEVICE FOR THE HOOFS OF UNGULATES, MORE PARTICULARLY HORSES

[75] Inventors: Jean F. Techer, Pont Salomon; Jean P. Onnis, Saint Etienne, both of France

[73] Assignee: Societe AMF, Pont Salomon, France

[21] Appl. No.: 184,422

[22] Filed: Apr. 21, 1988

[30] Foreign Application Priority Data

Apr. 23, 1987 [FR] France ................. 87 06044

[51] Int. Cl.$^4$ ............................... A01L 5/00
[52] U.S. Cl. ............................ 168/14; 168/28
[58] Field of Search .............. 168/12, 14, 26, 28, 168/DIG. 1

[56] References Cited

U.S. PATENT DOCUMENTS

| | | | |
|---|---|---|---|
| 198,885 | 1/1878 | Hartmann | 168/28 |
| 449,368 | 3/1891 | Kress | 168/28 |
| 3,285,346 | 11/1966 | Jenny et al. | 168/28 X |
| 3,630,289 | 12/1971 | Norberg | 168/12 X |
| 4,237,981 | 12/1980 | Stübbe | 168/14 X |

Primary Examiner—Robert P. Swiatek
Attorney, Agent, or Firm—Eric P. Schellin

[57] ABSTRACT

Device comprised of a screen (2) adapted to be secured in combination to fixtures of a horseshoe (1), and of a pre-forming plate (3) which cooperates with the whole surface of the horseshoe, and which is fastenable in a temporary manner to the screen to permit the injection of a thermoplastic material in the interior of the whole internal volume of the sole.

9 Claims, 4 Drawing Sheets

DAMPENING DEVICE FOR THE HOOFS OF UNGULATES, MORE PARTICULARLY HORSES

Dampening device for the hoofs of ungulates, more particularly horses.

The object of the invention pertains to the art of horse-shoeing.

Horse-racing is very trying for the animals, in the course of sporting events such as steeple-chase, reliability runs, trotting race and current horse-races.

All these sporting branches, generally practised on various grounds such as beaten grounds, stony grounds, asphalt-covered roads, are the cause of a rapid and untimely wearing down of the lower limbs, and specifically of the internal organs of the foot of the horse.

Various morphological ivestigations concerning the physical laws governing the foot of the horse have shown the necessity to abut the frog of the foot of the horse with regard to the ground. The frog is the external dampening organ, which makes it necessary to provide an iron shoeing for the protection of the sole of the foot of the horse and the absorption of the impact waves when the animal is stepping at a brisk pace, distributing thus the loads on the limb, while enhancing the adhesiveness on the asphalt and the paving-stones.

The elasticity of the horse foot resides in the property thereof to expand rearwardly at the time of the abutment of the frog on the ground, and to resume its original shape upon lifting the foot.

The frog of the foot of the horse, which is the dampening device proper for the foot externally, is owing to its formation the keeper of the opening of the heels, of the general shape of the foot and of the organs contained therein.

These organs are closely connected ; they are comprised of laminated tissues, of fibrocartilages, of the corium plantar pad of the frog and of a very dense vascular plexus, and they act as a hydraulic pump, therefore as dampening device, at the time of the impact.

Concerning these various organs, their dampening and operational actions are more or less important when the frog is or is not in abutment. If they are not abutted against the ground owing to a faulty abutment (accident or thickness of the horse-shoe), the frog and the corium thereof, the plantar pad, become emaciated, causing a contraction of the living tissues contained within the hoof. The result is a constriction of the poserior regions of the corneous housing, compressing painfully the interal organs against the third phalanx. Tissular inflammations appear and create at the level of the bones various pathological reactions which are called osteitis. At this stage of the illness, the horse begins to limp, and is irretrievably doomed to horse casting, on account of the irreversible lesions which have taken place.

Dampening systems have been proposed in the form of rubber sole on which the sole of the foot of the horse is resting. The French Patent Nos. 395,645 and 788,711, for instance, can be cited as references. However, the problem is not solved in a satisfying manner, as the frog is not always functionally abutted. The rubber soles are inserted and do not fill completely the interior of the sole of the foot of the horse.

Taking into account the problem which has been thus laid down, the invention has had for its object the elimination of the disadvantes of the usual horseshoes, while promoting the protection of the solear surface of the foot and the functional abutment of the frog, regardless of the volume and of the nature of the ground on which the animal is training or competing.

The object aimed at is therefore the re-establishement, on a horseshoed foot, of the physical qualities pertaining to the mechanical operation of the natural external and internal dampening of the foot of the horse, characterized by the elasticity of the corneous housing, as if the latter happened to be in its natural context, i.e. without iron horseshoeing.

For this purpose, the invention is noteworthy in that the dampening device includes a screen formed to be fastened in combination with fittings of the horseshoe, a pre-forming plate which cooperates with the whole surface of the horse-shoe and which is intended for being fastened temporarily with the screen, in order to permit the injection of a thermoplastic material inside the total internal volume of the sole, said pre-forming plate being removed after the polymerization of the plastic material which remains held in place by the fittings of the screen.

Owing to these arrangements, and in a particularly advantageous manner, the whole solear surface of the horse-shoed foot is connected snugly with the ground, permitting the violence of the impacts to be absorbed, sparing the vibrations for the complete natural suspension machine of the foot (bones, articulations, sinews, muscles). The impulsive effort is made easier by the device, owing to the elastomeric material being used. The use of this device alleviates the distortions of the corneous housing and has a tendency to preserve the natural shape of the foot.

Moreover, this device imparts a dactil safety to the animal on varying and uneven grounds, transforming the pace and the motion of the horse by the distribution of the impact waves on the whole surface of the foot, whereas these waves, up to now, were taken up solely by the wall through the intermediary of the horseshoe.

The invention is set forth more fully in the following description, with reference to the appended drawings, in which.

Figure 1:
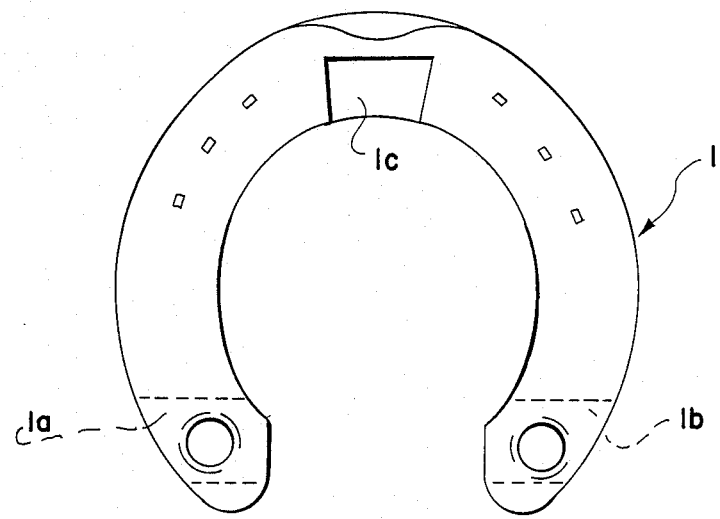
FIG. 1 is a plan view of a horseshoe adapted to receive the screen.
Figure 2:
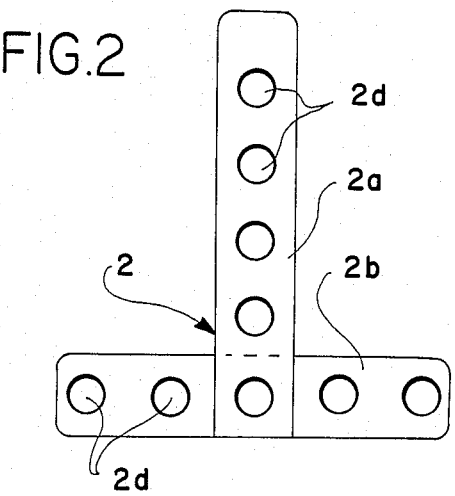
FIG. 2 is a plan view of the screen.
Figure 6:
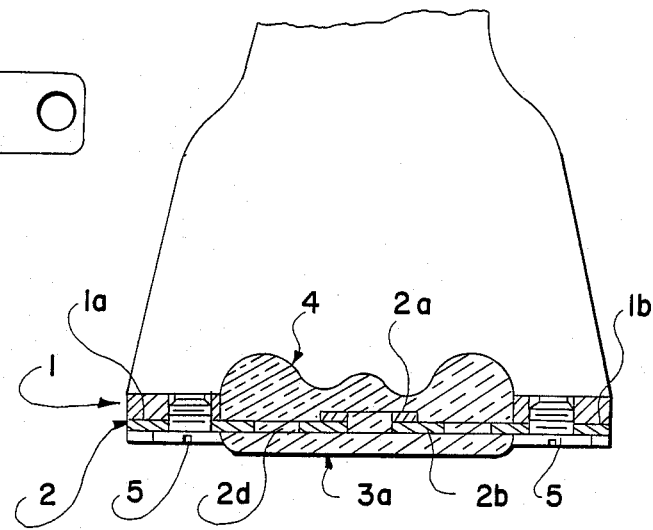
FIG. 6 is a cross-sectional view along the line 6—6 of FIG. 4, after the casting of the elastomeric material.
Figure 3:
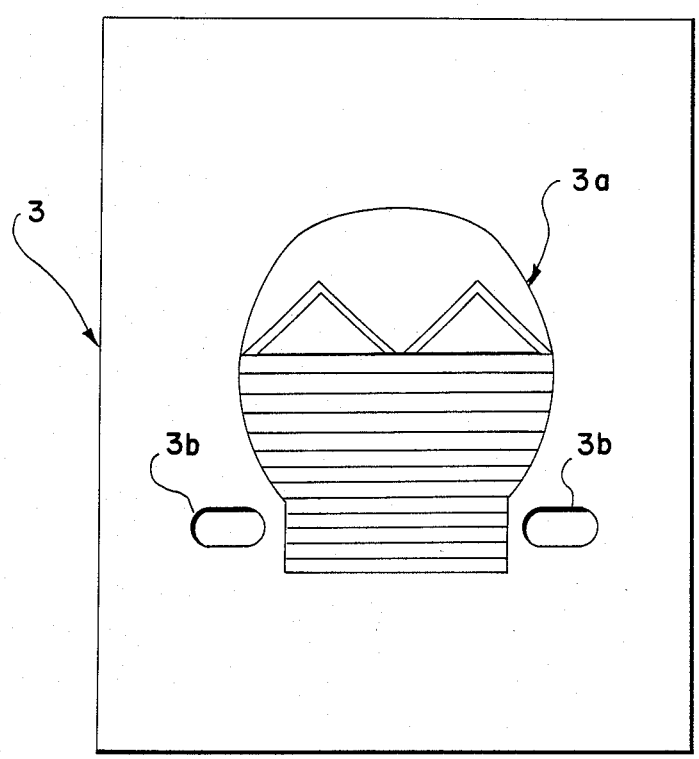
FIG. 3 is a plan view of the preforming plate.
Figure 4:
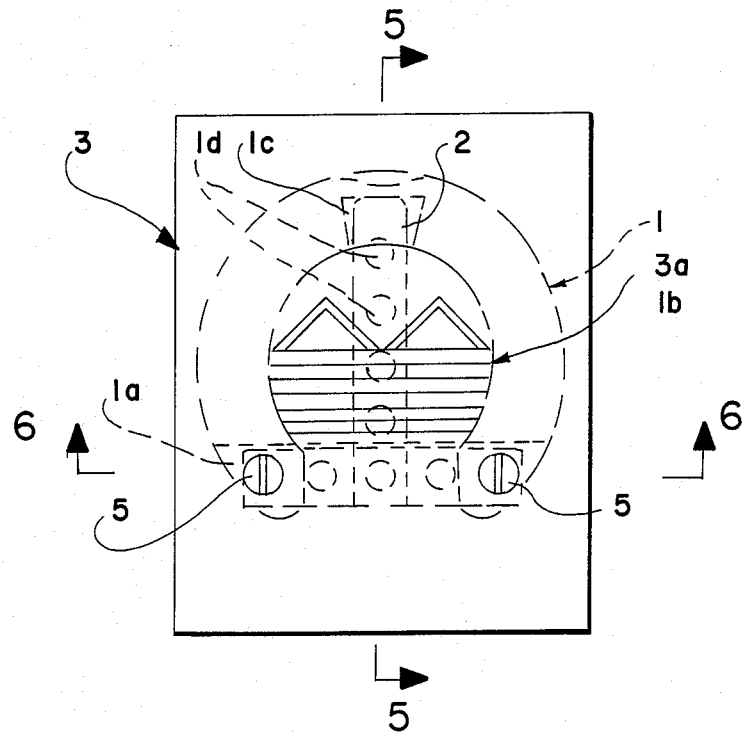
FIG. 4 is a plan view showing the fastening of the screen and of the preform.
Figure 5:
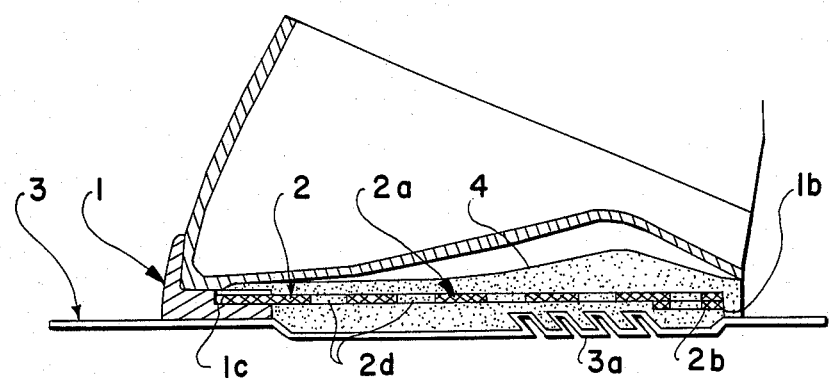
FIG. 5 is a longitudinal sectional view along the line 5—5 of FIG. 4, after the casting of the elastomeric material.
Figure 7:
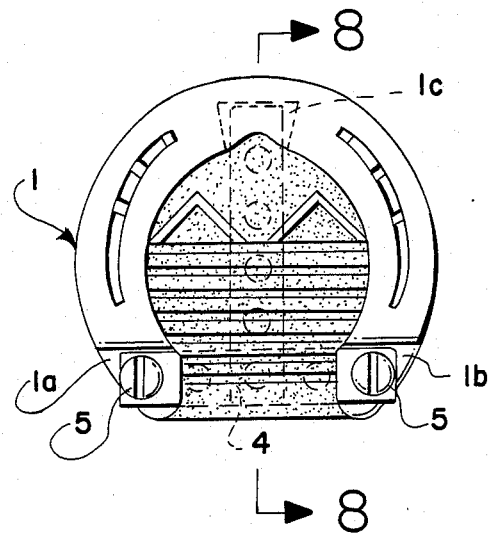
FIG. 7 is a plan view of the horseshoe equipped with the device, the pre-forming plate being omitted.
Figure 8:
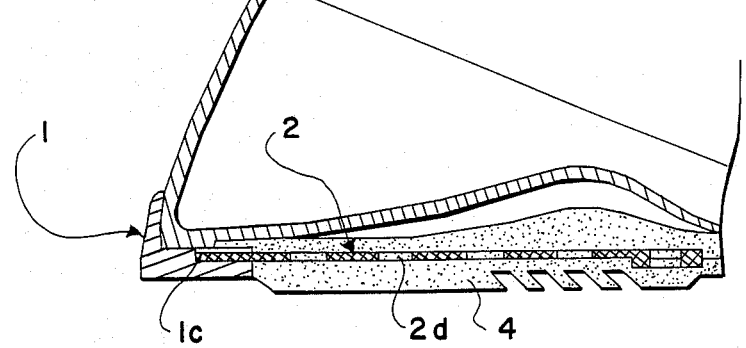
FIG. 8 is a sectional view along the line 8—8 of FIG. 7.

In order to make the object of the invention better understood, this invention will be described now more fully, in a non rstrictive manner, and with reference to the examples of embodiment shown in the Figures of the drawing.

The dampening device includes in combination the following essential elements :
   a horseshoe (1),
   a screen (2), a pre-forming plate (3), for the casting of an elastomeric material (4) within the sole of the roof.

The calkins of the horseshoe (1) are provided each one, adjacent to their free end, internally or externally, with notches (1a) and (1b), while the middle of the covering of said horse shoe, at the level of the medial post, is provided internally with a notch (1c). These notches (1a), (1b) and (1c) are adapted to ensure the positioning and the fastening of the screen (2). Also, notches (1a) and (1b) may be formed on either the side of the lower face of the horseshoe or the side of the upper face of the horseshoe, whereas notch (1c) is formed on the side of the upper face.

For this purpose, the screen (2) is generally T-shaped. The medial leg (2a) is housed within the notch (1c), while the ends of the transverse leg (2b) are engaged within the notches (1a) and (1b) and are for instance secured thereto by means of screws (5).

The legs of the screen (2) are perforated therethrough by a plurality of holes (2d) in order to ensure the interpenetration of the elastomeric material and to provide the anchoring thereof.

It will be noted that the leg (2) can be made directly in one operational step only, such as stamping, or can be comprised of two distinct parts, and then assembled by any known means. This screen is flat or very slightly curved, more particularly in the transverse direction. Other forms of embodiment of the screen are possible.

Figure 9:
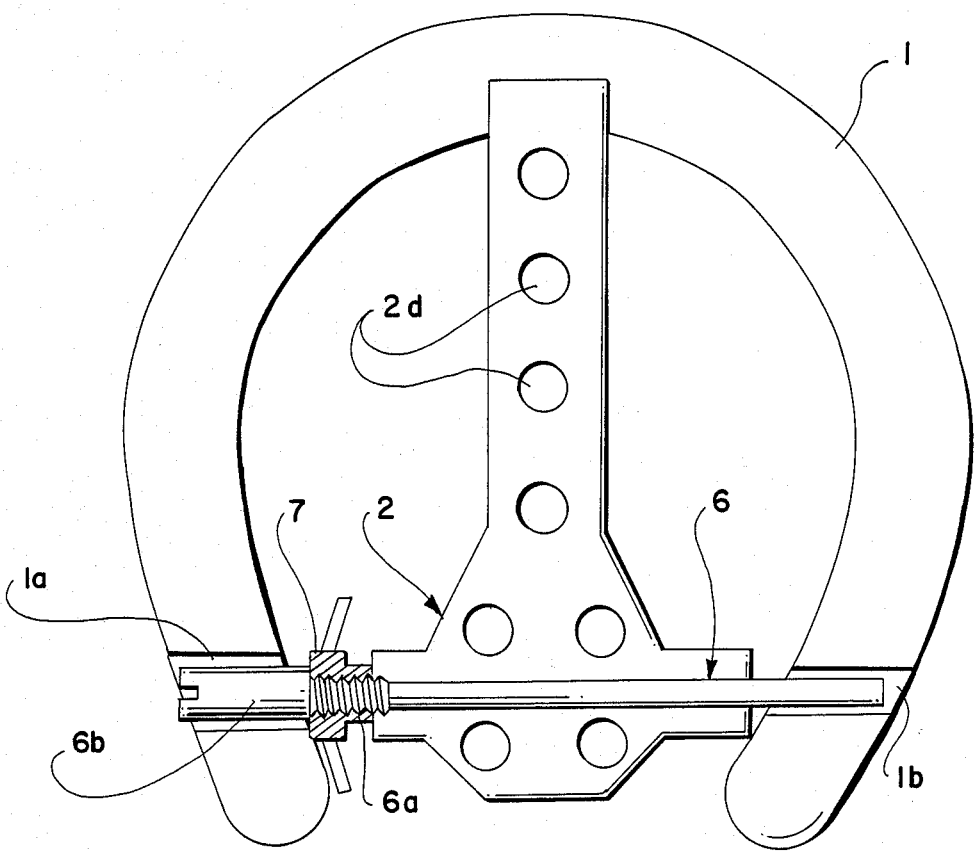
FIG. 9 is a plan view showing a form of embodiment for securing the screen.

For instance, and as shown in FIG. 9, the screen (2), at the level of a portion of the transverse leg (2b), in integral with a rod (6) which cooperates with the notches (1a) and (1b). A portion of this rod is provided with a screw-threaded bearing face (6a) for cooperation with an internal nut system (7). One (6b) of the ends of the rod (6) is designed for actuation from the outside of the horseshoe in order to ensure the connection between the screen (2) and said horseshoe (1).

The pre-form (3) consists of a plate with very nearly in the medial portion thereof an indentation (3a) corresponding to he internal periphery of the horseshoe (1), said indentation having hollow and raised asperities in order to provide a non-skid surface. This preform (3), which corresponds to the negative volume of the dampening device, is provided with apertures (3b) capable of cooperating with the screws (5) of the screen, for the temporary fastening thereof. The plate which constitutes the preform (3) is very widely contoured in the direction of the length, at the level of the sole.

The preform (3), which for instance may be made by thermomolding, is in a known manner arranged for permitting the injection of the plastic material with which the internal volume of the sole is to be filled. For this purpose, the device in accordance with the invention will be used as follows.

The screen (2) is positioned simultaneously with the horse-shoe (1), when the latter is put in position for use. The leg (2b) is fastened by the screws (5) within the fixtures of the calkins of the horseshoe (1), while the free leg (2a) is housed within the internal indentation (1c) of the horseshoe at the time of the mounting on said horseshoe. It will be noted that the free portion of the screen must be placed at a distance of two millimeters from the frog, at the level of the plane of the upper surface of the horseshoe.

The preform (3) is secured in combination with the screen (2) so that the nonskid portion (3a) will be situated inside the periphery of the internal edge of the horseshoe (1).

A thermoplastic material in the liquid condition is then injected, across the preform (3), into the total space inside the solear indentation of the hoof. The selected material is adapted to be capable of taking the exact shape of the various raised portions of the solear part of the foot of the horse, without adhering to this solear part. The internal shape of the foot is therefore wholly and integrally reproduced. The screen (2) is imbedded in the plastic material, the various holes (2d) providing for the cohesiveness of the assembly.

After the polymerisation, the preform (3) is removed, so that there will be obtained a nonskid dampening pad abutting on the ground and adapted to provide a snug connection with the ground, for the whole solear surface of the horseshoed foot. The general volume of this pad corresponds very accurately to the internal volume of the sole defined by the frog of the hoof and the thickness of the horseshoe.

Owing to this design, the dampening device is easily detachable in the course of the horseshoeing process. It is merely necessary to unscrew the fastenings screws of the screen (2).

In the form of embodiment illustrated, the screen (2) more particularly the transverse leg (2b), is secured on the external face of the horseshoe (1).

In an alternative form of embodiment, it is contemplated to adapt the dampening device on horseshoe the thickness of which is lower than 8 mm. The screen is secured to the calkins on the side of the upper face of the horseshoe (1). In this case, on account of the thickness, the detachable device is not necessary and the screen can be secured by riveting, welding or otherwise.

The advantages will be clearly apparent from the description. More particularly, it will be pointed out, besides the advantages already specified, that this device enhances the performances of the horse on all the grounds, and provides a faultless adhesivenes, as well as a protection of the solear part against the blunt objects or obstacles, together with a tight sealing against the infiltrations of sand and gravel, preventing thus the limping observed as a result from the action of the snow.

We claim:

1. Dampening device for horse hoofs equipped with horseshoes, characterized in that said device is comprised of a screen (2) adapted to be secured in combination to fixtures of the horseshoe (1), and of a pre-forming plate (3) which cooperates with the whole surface of the horseshoe, and which is fastenable in a temporary manner to the screen in order to permit the injection of a thermoplastic material into the interior of the whole internal volume of the sole, said pre-forming plate being removed after the polymerisation of the plastic material which remains held in place by screen fittings.

2. Device according to claim 1, characterized in that the screen (2) has a T-shape and is provided with a plurality of holes to ensure the cohesiveness of the injected material ; said screen having legs (2a) and (2b) that are positioned and fastened in combination with the fixtures of the horseshoe.

3. Device according to any one of claims 1 or 2, characterized in that the fixtures of the horseshoe include a notch (1a)–(1b) formed adjacent to the free ends of the calkins of the horseshoe and a second notch (1c) formed in the middle of a covering of said borseshoe, at the level of a middle post, the end of a medial leg cooperating in abutment with the notch (1c), while the ends of a transverse leg (2b) cooperate with notches (1a) and (1b) and are secured thereto with assembling organs.

4. Device according to claim 3, characterized in that the notches (1a) and (1b) are formed on the side of the lower face of the horseshoe, and the second notch (1c) is formed on the side of the upper face.

5. Device according to claim 3, characterized in that the notches (1a) and (1b) are formed on the side of the upper face of the horseshoe, and the second notch (1c) is formed on the side of the upper face.

6. Device according to claim 2, characterized in that the pre-forming plate (3) is comprised of a contoured plate having in the medial part thereof an indentation (3a) corresponding to the internal periphery of the horseshoe, said indentation having hollow and raised protions in order to constitute and define a nonskid surface.

7. Device according to claim 6, characterized in that the pre-forming plate is provided with apertures cooperating with screen assembly organs.

8. Device according to claims 1 or 6 characterized in that the pre-forming plate is drilled to permit the injection of the plastic material.

9. Device according to claim 1, characterized in that after the polymerisation, the injected plastic material forms a ground abutment pad in which the screen is imbedded, the volume of said pad corresponding to the internal volume of the sole defined by the frog in order to ensure the snug connection of the solear surface of the horseshoed foot.

* * * * *